(12) United States Patent
Macioce, Jr. et al.

(10) Patent No.: US 6,502,454 B1
(45) Date of Patent: Jan. 7, 2003

(54) COLLECTION SHROUD FOR INDOOR TIRE TEST APPARATUS

(75) Inventors: Richard J. Macioce, Jr., Massillon, OH (US); David O. Stalnaker, Hartville, OH (US); Craig K. McClung, Massillon, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/710,119

(22) Filed: Nov. 9, 2000

(51) Int. Cl.[7] .............................................. B60C 23/02
(52) U.S. Cl. ....................................................... 73/146
(58) Field of Search ................................ 73/146, 146.2, 73/146.3, 146.4, 146.5, 146.8

(56) References Cited

U.S. PATENT DOCUMENTS

| | | |
|---|---|---|
| 2,766,618 A | 10/1956 | Stiehler et al. ................ 73/146 |
| 3,899,917 A | 8/1975 | Kisbany ............................ 73/8 |
| 4,272,301 A | 6/1981 | Galbraith et al. ............... 134/8 |
| 4,938,055 A | 7/1990 | Tsuda ................................ 73/8 |
| 5,504,968 A | 4/1996 | Pressley ....................... 15/302 |
| 5,703,284 A | 12/1997 | Gerhards et al. ............. 73/146 |

*Primary Examiner*—Max Noori
*Assistant Examiner*—Andre Allen
(74) *Attorney, Agent, or Firm*—John M Vasuta; Michael Sand (57) ABSTRACT

An indoor tire testing apparatus has a rotatable road wheel with an abrasive surface and a tire support mechanism for rotatably supporting and moving a tread of a tire into contact with the abrasive surface. A vacuum chamber having a pair of nozzles is located adjacent the area of contact between the abrasive surface and tire tread. A movably mounted shroud is formed by a plurality of metal panels and forms a chamber for receiving a tire therein during testing. Temperature and moisture is controlled within the shroud interior and vacuum chamber through a duct connected to the shroud. A plurality of brushes partially close open sides in the vacuum chamber and shroud to prevent the escape of powder and particles from within the chambers. The vacuum nozzles remove the powder and particles to a remote location to prevent their dispersion into the surrounding atmosphere.

15 Claims, 12 Drawing Sheets

COLLECTION SHROUD FOR INDOOR TIRE TEST APPARATUS

BACKGROUND OF THE INVENTION

1. Technical Field

The present invention relates to indoor tire testing equipment and in particular to a shroud placed about the tire for collection of a dispensed powder and particles released from the tire during contact with the abrasive surface of a road wheel to prevent dispersion of the powder and particles into the surrounding atmosphere. Even more particularly, the invention relates to such a collection shroud which provides a controlled environment for the area of contact between the abrasive surface of the road wheel and the tire tread.

2. Background Information

Various types of indoor tire wear testing apparatus have been developed in order to test a tire in an environment closely simulating actual outdoor driving conditions. In these wear test apparatus, a tire is mounted on a test machine and loaded against a rotating road wheel or drum which has an abrasive surface attempting to simulate the actual road surface. This type of testing is typically performed in a temperature controlled test cell or room in order to attempt simulating actual outdoor driving conditions. As the tire is tested, tread rubber is slowly worn away from the tread. To prevent the abraded gummy rubber particles from adhering to the tire and/or the abrasive surface of the road wheel, various types of fine powder are generally sprayed or dusted onto the abrasive surface of the road wheel which mates with the rubber particles to prevent gumming. This is essential in order to achieve more realistic tire wear. Furthermore, it is essential that the powder and rubber particles be collected and removed to a remote location to prevent its accumulation in the test area. Some examples of prior art tire testing machine and dust collection systems are shown in U.S. Pat. Nos. 2,766,618; 3,899,917; 4,272,301; 4,938,055; 5,504,968 and 5,703,284.

Although these prior tire test machines and dust collection systems perform satisfactory for their intended use, it is desirable that, in addition to providing an efficient dust and particle collection system, to be able to control the environment such as the temperature, moisture, etc. adjacent the contact area between the road wheel and tire tread, to more closely simulate actual outdoor driving conditions affecting tire wear.

SUMMARY OF THE INVENTION

The present invention provides a collection shroud for an indoor tire test machine which efficiently collects powder and particles released from the tire during testing and transports it to a remote location to prevent the powder and particles from being discharged into the surrounding atmosphere.

The shroud of the present invention comprises a movably mounted housing which facilitates placement and removal of a tire on and from the tire test machine, which shroud partially encloses the tire in a chamber located adjacent a pair of vacuum collection units in order to retain the powder and particles in the housing for subsequent removal by the vacuum units.

The collection shroud furthermore permits control of ambient temperature, moisture, etc. in the immediate area around the tire when enclosed by the shroud as opposed to controlling the ambient temperature of the entire test room.

Another feature of the invention is that the collection shroud permits a range of tire sizes to be tested and permits the easy access for installation and removal of the tire before and after testing.

A further feature of the invention is providing a freestanding floor mounted shroud in which the collected powder and particles are channeled through ducts into commercially available dust collection systems before it becomes airborne within the test room, which allows tire wear testing to be performed in either direction of rotation without affecting the operation of the vacuum and ambient control systems, and which provides a seal between the shroud and tire test equipment.

Another aspect of the invention is forming the collection shroud of sheet metal panels which enclose the tire on four sides with the fifth side being partially open to permit dynamic movement of the test machine for loading the tire against the road wheel, and which uses brush assemblies to minimize leakage of powder and particles from the partially open side during testing of a tire and dispensing of the powder thereon.

The foregoing advantages, construction and operation of the present invention will become more readily apparent from the following description and accompanying drawings.

DESCRIPTION OF THE PREFERRED EMBODIMENT

Figure 1:
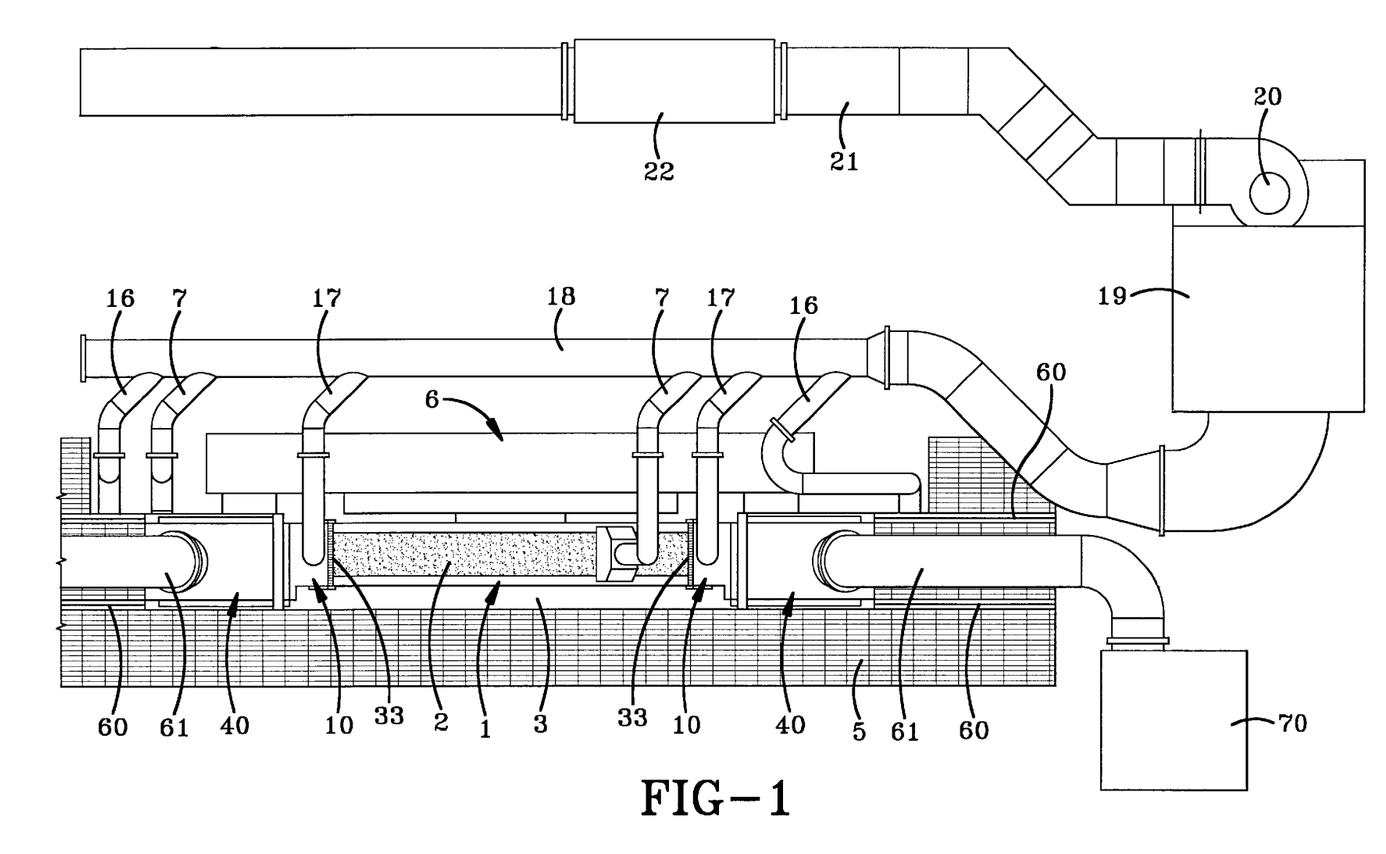
FIG. 1 is a diagrammatic top plan view of an indoor tire ear testing facility incorporating the improved dust collection shroud.
Figure 2:
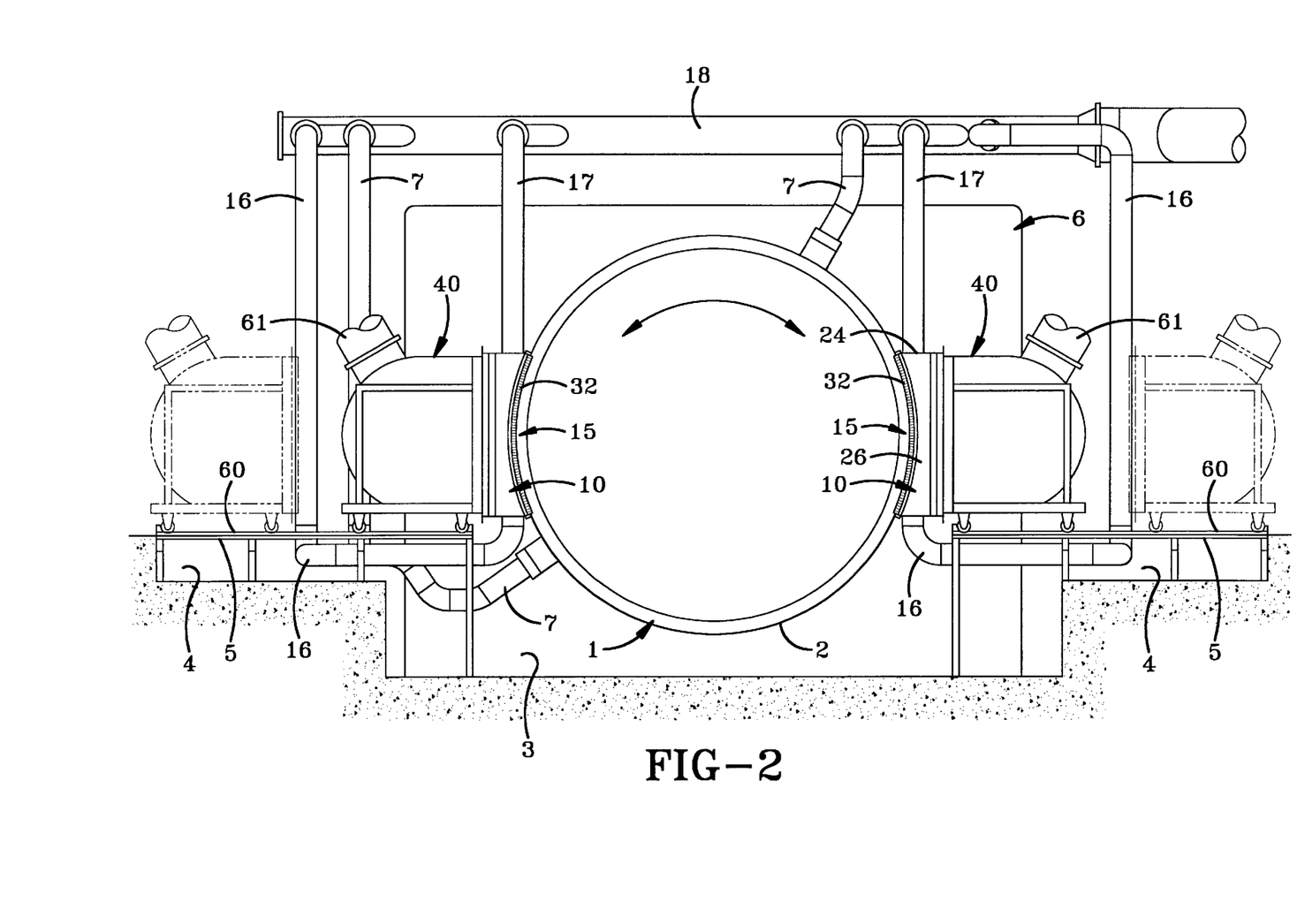
FIG. 2 is an enlarged fragmentary side elevational view of the tire test apparatus with a pair of the collection shrouds shown in full lines in operative position and in dot-dash lines in retracted position.

One type of indoor tire test apparatus in which the improved collection shroud is utilized is shown particularly in FIGS. 1 and 2. The test apparatus will usually be located in an enclosed room and will include as its main components a power driven rotatably mounted road wheel 1, which will have an outer circumferential abrasive surface 2 mounted thereon. Road wheel 1 is rotated by the usual drive mechanism of a tire test machine 6 well known in the art, and thus is not described in further detail. Road wheel 1 may be located above a work access pit 3 as shown in FIG. 2, and may include two shallower pits 4 extending outwardly therefrom. Pits 3 and 4 are covered by grating 5 for safety of the test personnel.

The particular tire test apparatus shown in FIGS. 1 and 2 includes two tire test stations located at diagrammatically opposite sides of the road wheel, and which are generally similar to each other. Each tire test station will be provided with a powder discharge duct 7 which delivers a fine powder and deposits it on the abrasive surface of the road wheel, generally at about 60 degrees upstream of the contact area 15 between the tire and abrasive surface.

A vacuum chamber 10 is located adjacent each area of contact 15 between the tire and abrasive surface for collection and removal of the spent powder and particles therefrom. Again, two diametrically opposite vacuum chambers 10 are shown in FIGS. 1 and 2, although for many applications only one tire test contact area is provided.

In accordance with one of the features of the invention, a pair of vacuum units 11 and 12 (FIGS. 8–12), are mounted within each vacuum chamber 10 above and below the area of contact 15. Vacuum units 11 and 12 include a vacuum pickup nozzle 13 at the inlet ends of discharge ducts 16 and 17. Ducts 16 and 17 connect to a main vacuum duct 18 which communicates with a dust drum 19 and an exhaust fan 20 which also can be the vacuum source for units 11 and 12. Dust drum 19 will collect the larger particles from the air stream with the smaller particles being removed by filters 22 mounted in discharge duct 21. The clean air then is discharged into the surrounding atmosphere. In the particular duct arrangement shown in FIGS. 1 and 2, powder dispensing ducts 7 are located within vacuum duct 18 and are connected to a remote source of a powder supply (not shown) but could take separate paths to the powder supply. The particular vacuum and powder duct work shown particularly in FIGS. 1 and 2, can vary without affecting the concept of the invention.

Vacuum chamber 10 (FIGS. 7 and 8) includes top and bottom walls 24 and 25 and opposed sidewalls 26 and 27 preferably formed of sheet metal. A front access opening 28 of chamber 10 is defined by a surrounding angle bracket 30. A plurality of arcuate-shaped flexible brushes 32 are mounted on vacuum chamber 10 and extend between sidewalls 26 and 27 and road wheel 1 to assist in preventing discharge of the powder and particles into the surrounding atmosphere. A pair of brushes 33 are also mounted on vacuum chamber 10 (FIGS. 1 and 8) and extend transversely between walls 26 and 27. Sidewall 27 is formed with a cutout 29 which is partially enclosed by a pair of brushes 31. Cutout 29 enables a tire mounting spindle 34 to move inwardly toward road wheel 1 for the testing of small tires.

Figure 7:
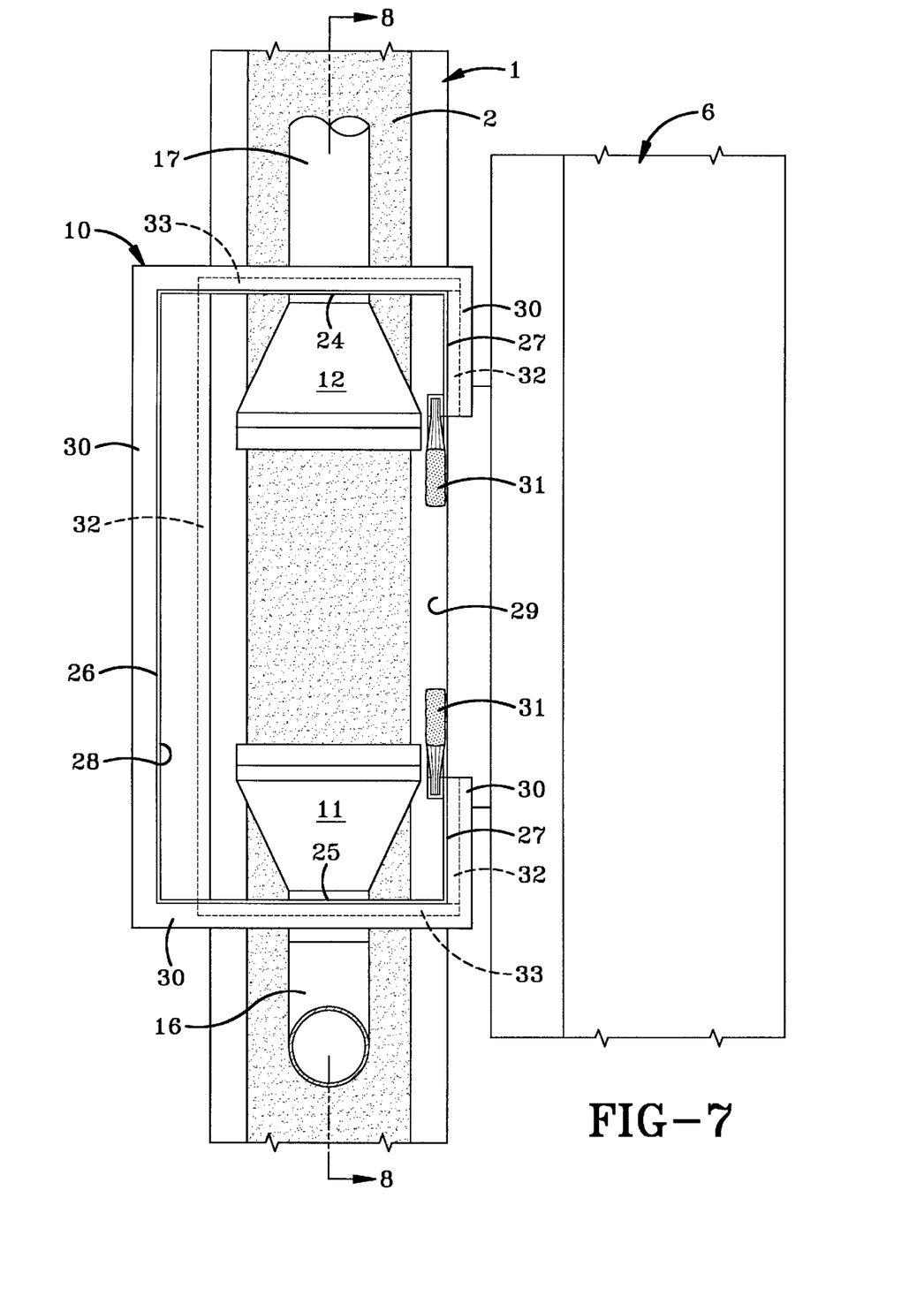
FIG. 7 is an enlarged fragmentary view looking in the direction of arrows 7—7, FIG. 4.
Figure 8:
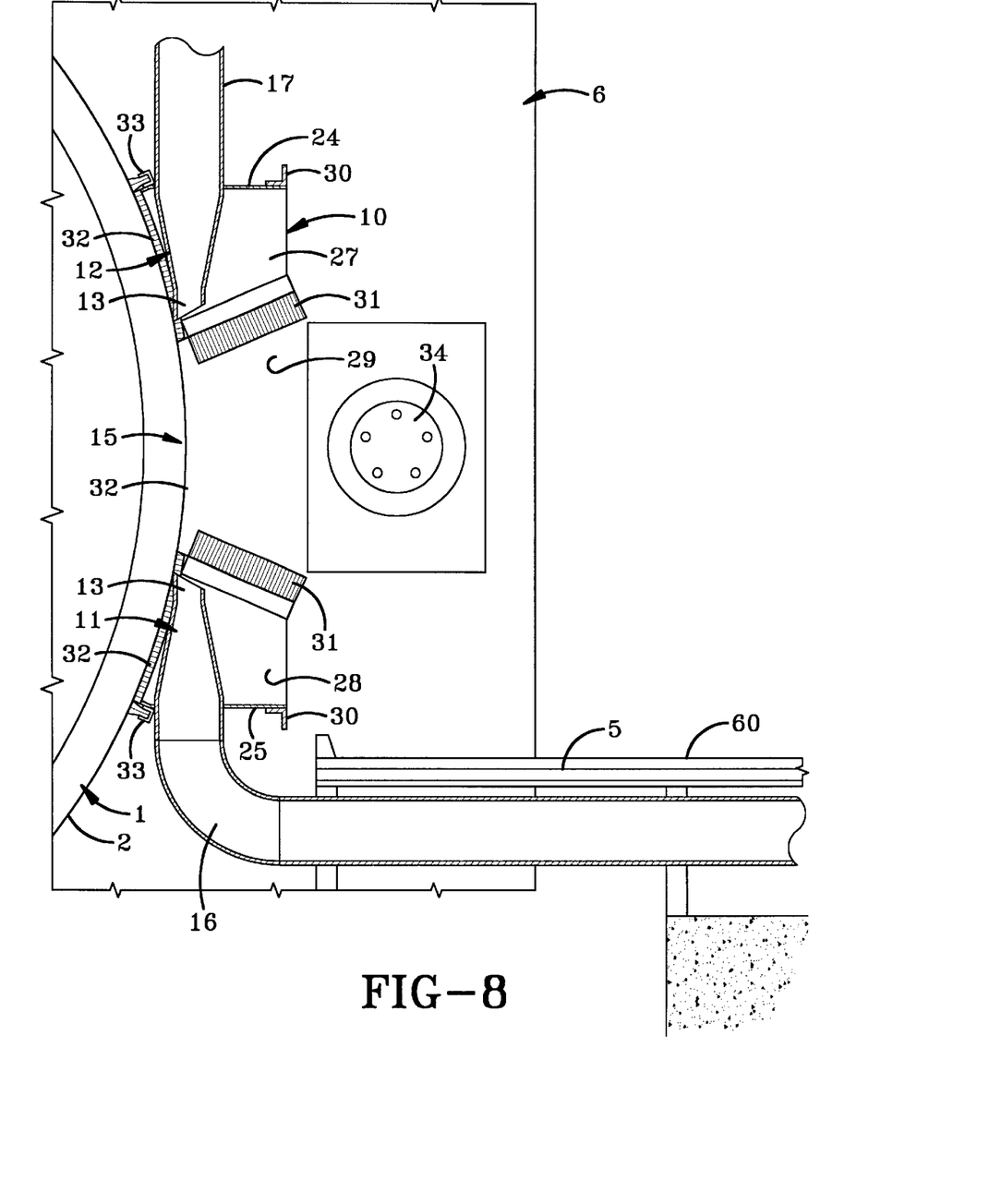
FIG. 8 is a fragmentary sectional view taken on line 8—8, FIG. 7.

Ducts 16 and 17 extend through walls 24 and 25 respectively, and form a generally tight engagement therewith. Sealing brushes 32 remain in a fixed mounted position adjacent the road wheel and once installed need not be adjusted irrespective of the tire size being tested since the area of contact 15 remains midway between the two nozzles 13 for removal of the powder and particles from chamber 10. The pair of vacuum ducts 16 and 17 on opposite sides of the area of contact 15, enable the tire to be rotated in either direction without affecting the removal of the powder and particles. Brushes 31 extend into cutout 29 to help seal the vacuum chamber to prevent the escape of powder and particles from the chamber.

Figure 3:
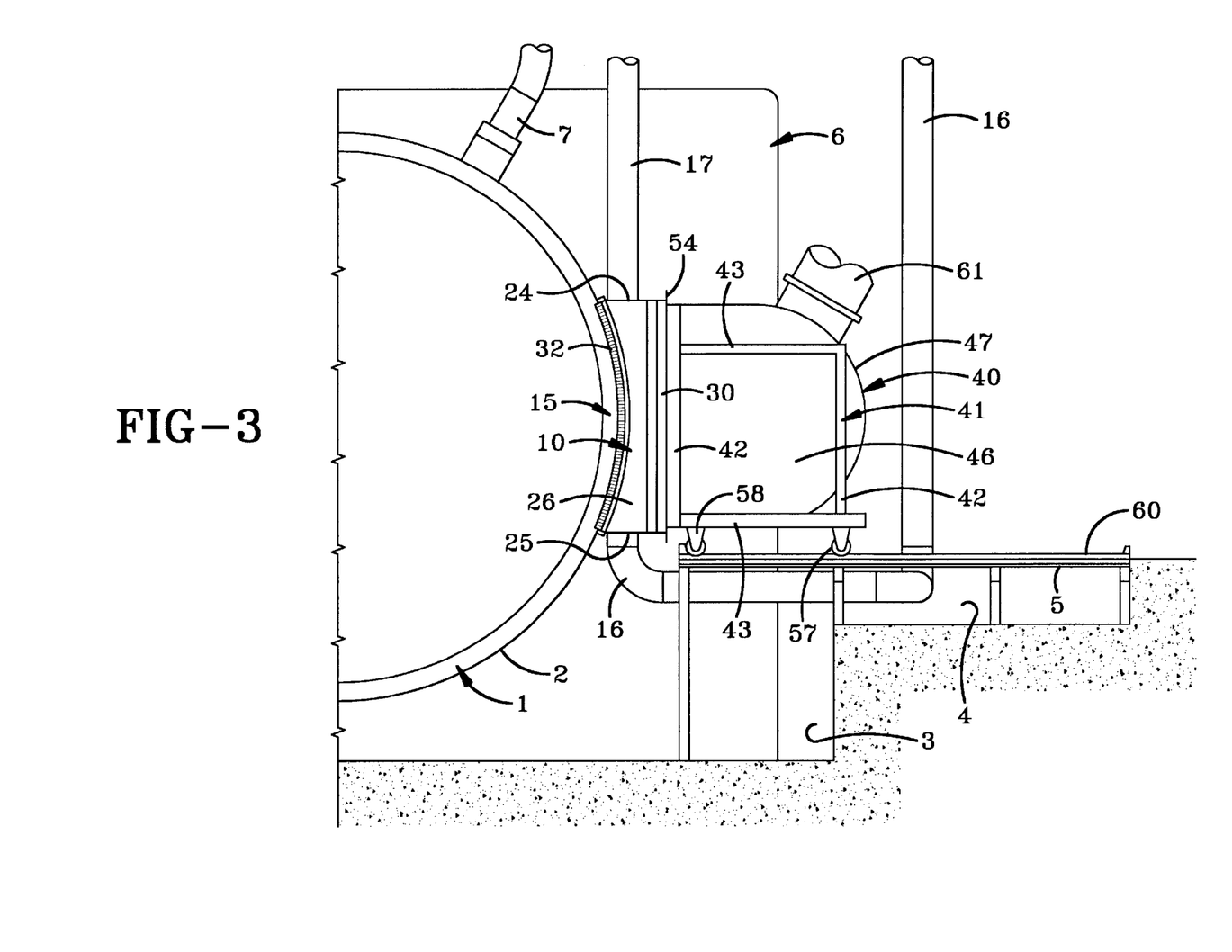
FIG. 3 is an enlarged view of one of the collection shrouds in operative position with the road wheel.
Figure 5:
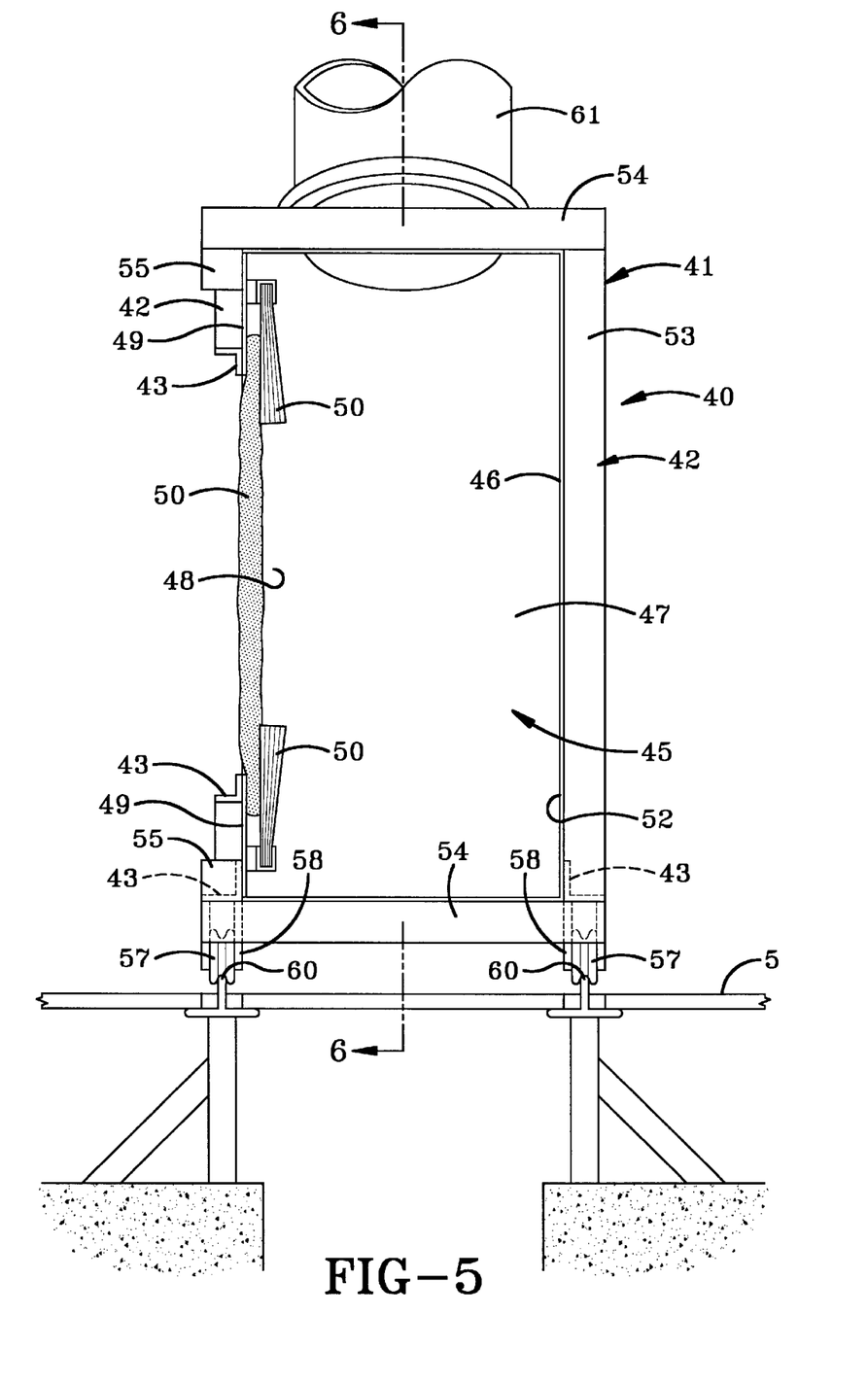
FIG. 5 is an enlarged fragmentary view looking in the direction of arrows 5—5, FIG. 4.
Figure 6:
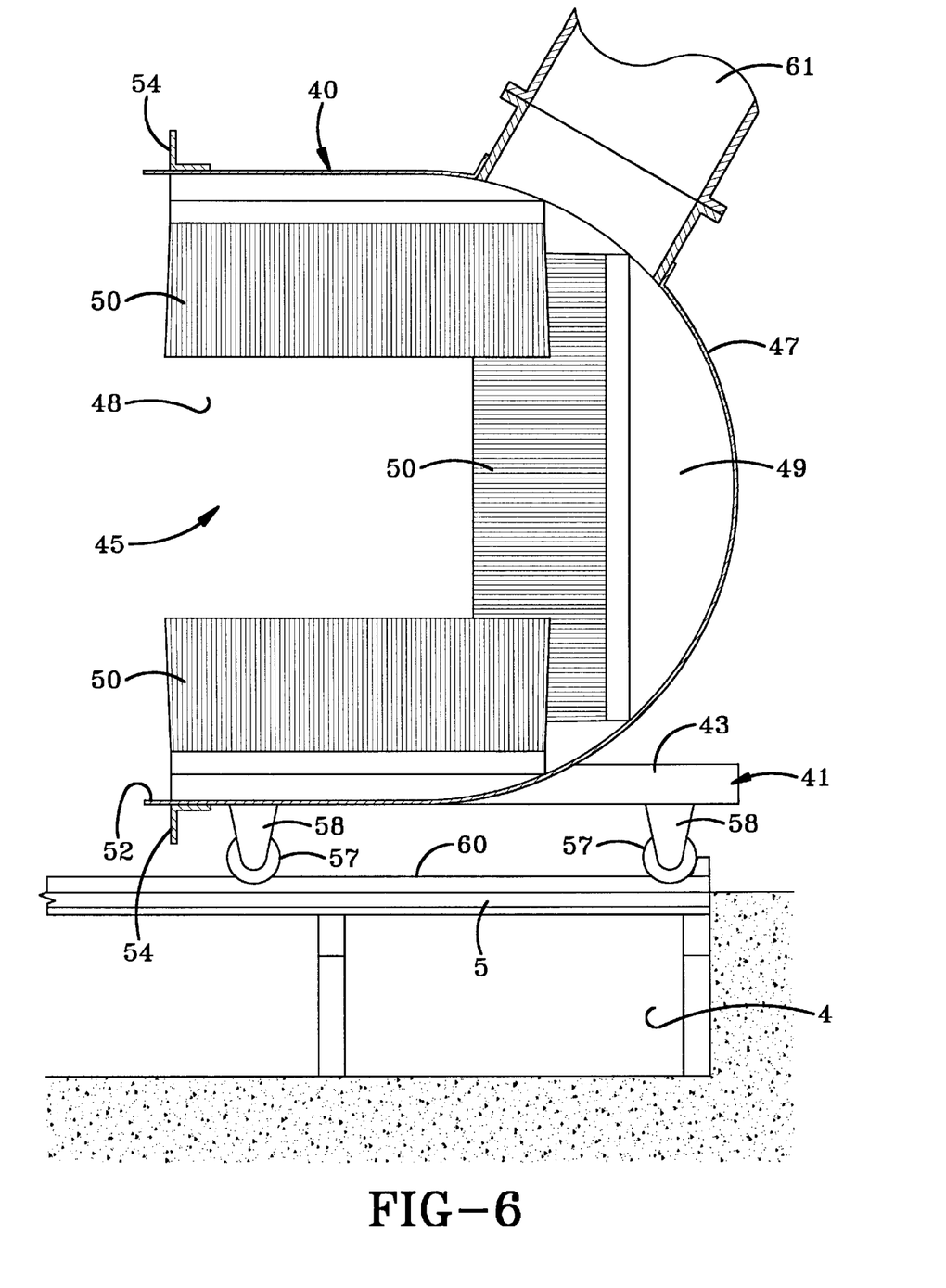
FIG. 6 is a fragmentary sectional view taken on lines 6—6, FIG. 5.

In accordance with another feature of the invention, a pair of collection shrouds, each indicated generally at 40, are located diagrammatically opposite of each other in line with the areas of contact 15. Again, many tire test machines have only a single test station and therefore require only one collection shroud. Thus only one shroud is described in detail and shown in most detail drawing figures. Collection shroud 40 includes a pair of rectangular shaped spaced apart frames 41 (FIG. 3), each formed by a pair of vertical L-shaped braces 42 and upper and lower horizontal L-shaped braces 43. A tire receiving chamber 45 is formed by an outer sidewall 46, a partial inner wall 49 and a curved end wall 47 which are secured to frame 41 by welding on other type fasteners. Wall 49 includes an opening 48 (FIG. 6) for receiving spindle 34 therein, and is partially enclosed by three brushes 50, two of which extend horizontally along horizontal braces 43 with a third extending vertically therebetween. The front end of collection shroud 40 is open at 52 (FIGS. 5 and 6), and is surrounded on three sides by the vertical angled flange 53 of bracket 42 and top and bottom angled flanges 54. A pair of side angled flanges 55 extend along portions of side opening 48.

Shroud 40 is movably mounted on a pair of rails 60 by wheels 57 rotatably mounted on brackets 58 secured to horizontal bracket 43. This enables the shroud to be moved easily towards and away from road wheel 1 to facilitate the placement and removal of a tire on and from spindle 34.

In accordance with another feature of the invention, a duct 61 communicates with tire receiving chamber 45 and is connected to a source of heating and/or cooling 70 (FIG. 1) to control the temperature and moisture within shroud 40 by supplying or removing heat and moisture as needed, in order to regulate the temperature and moisture at the area of contact 15. Heretofore, the ambient temperature of the entire tire test room was controlled in order to provide this feature. Thus, it is readily seen that only a small amount of heat and/or cooling is needed to achieve the desired temperature at the critical area of contact 15 in order to more closely simulate actual outside driving conditions.

Tire test machine 6 is of a standard construction and is readily known in the art and thus is not described in detail except that it rotates road wheel 1 and spindle 34 on which a tire 65 is mounted, and is able to provide a slip and camber angle to spindle 34 and will also coordinate the rotation of load wheel 1 therewith. These drive machines are connected to usual computers and/or electronic controllers for controlling their motion and for providing and obtaining certain control data.

Figure 4:
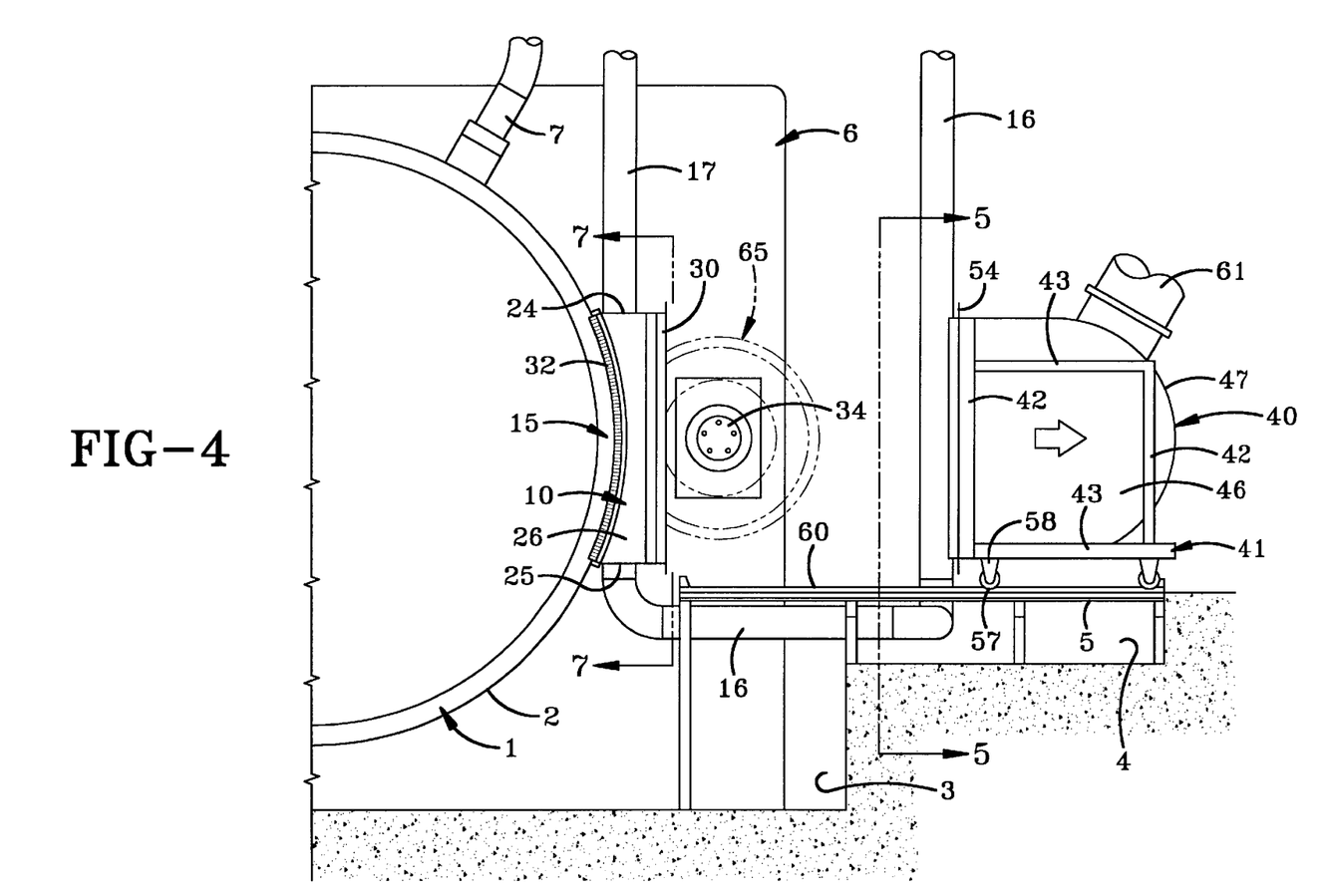
FIG. 4 is a view similar to FIG. 3 showing the collection shroud in a retracted position and a test tire in dot dash lines.
Figure 9:
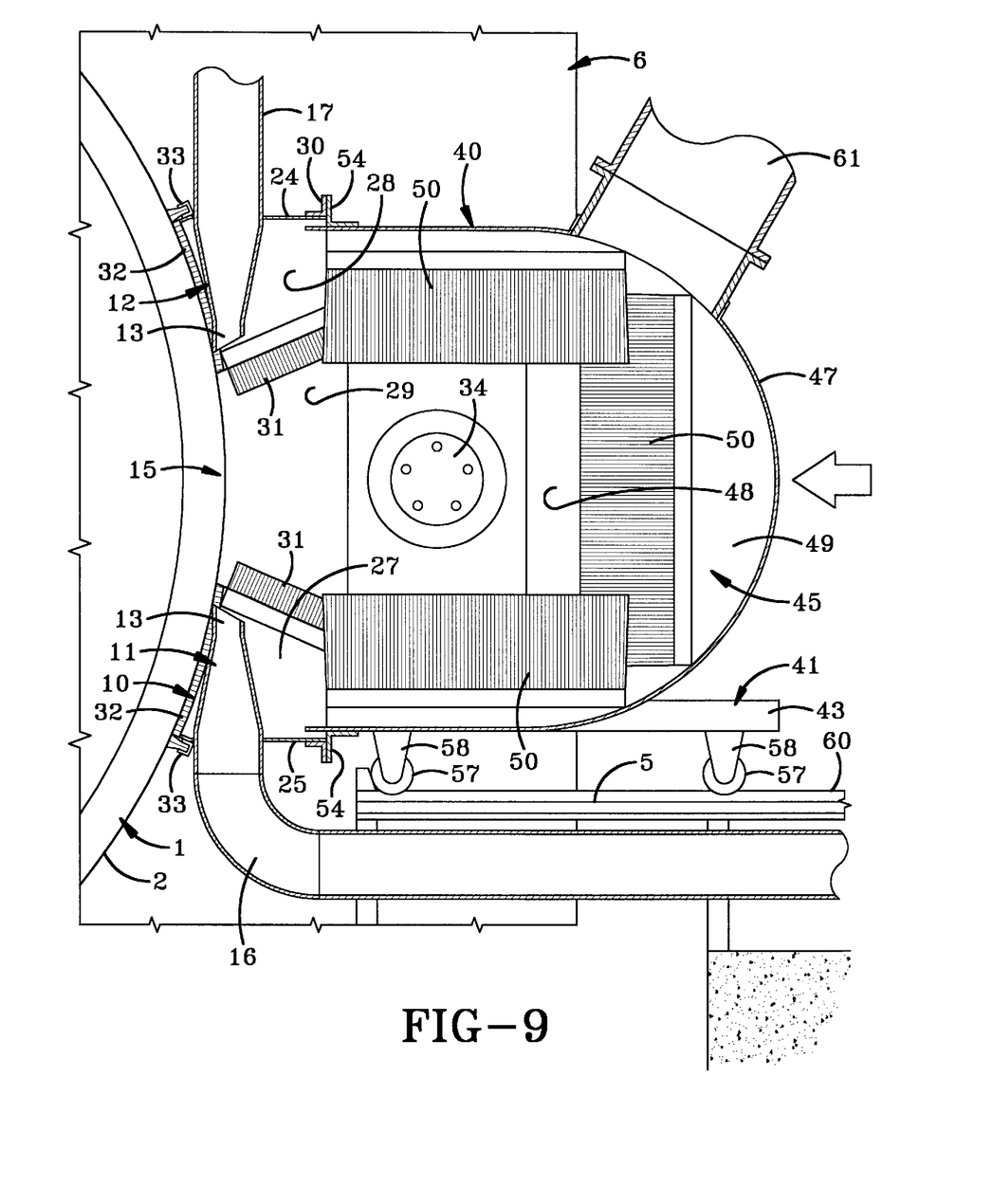
FIG. 9 is an enlarged fragmentary sectional view showing the collection shroud in operative position without a tire being mounted on the test apparatus.

The use of vacuum chamber 10 and collection shroud 40 and their cooperation with the tire test apparatus is set forth below. A usual tire 65 is mounted on spindle 34 as shown in dot dash lines, FIG. 4. Collection shroud 40 is moved from its retracted position of FIG. 4 to the closed test position of FIGS. 9–12. When in this closed position, flanges 53, 54 and 55 of shroud 40 abut against the aligned flanges or angle brackets 30 on vacuum chamber 10, to substantially enclose vacuum chamber 10 and place it in communication with chamber 45 of collection shroud 40. Brushes 31 and 50 will move around and adjacent to tire mounting spindle 34 as shown in FIG. 9, and also will be in close contact with rotating tire 65 to further assist in sealing vacuum chamber 10 and shroud chamber 45 from the surrounding atmosphere.

Figure 10:
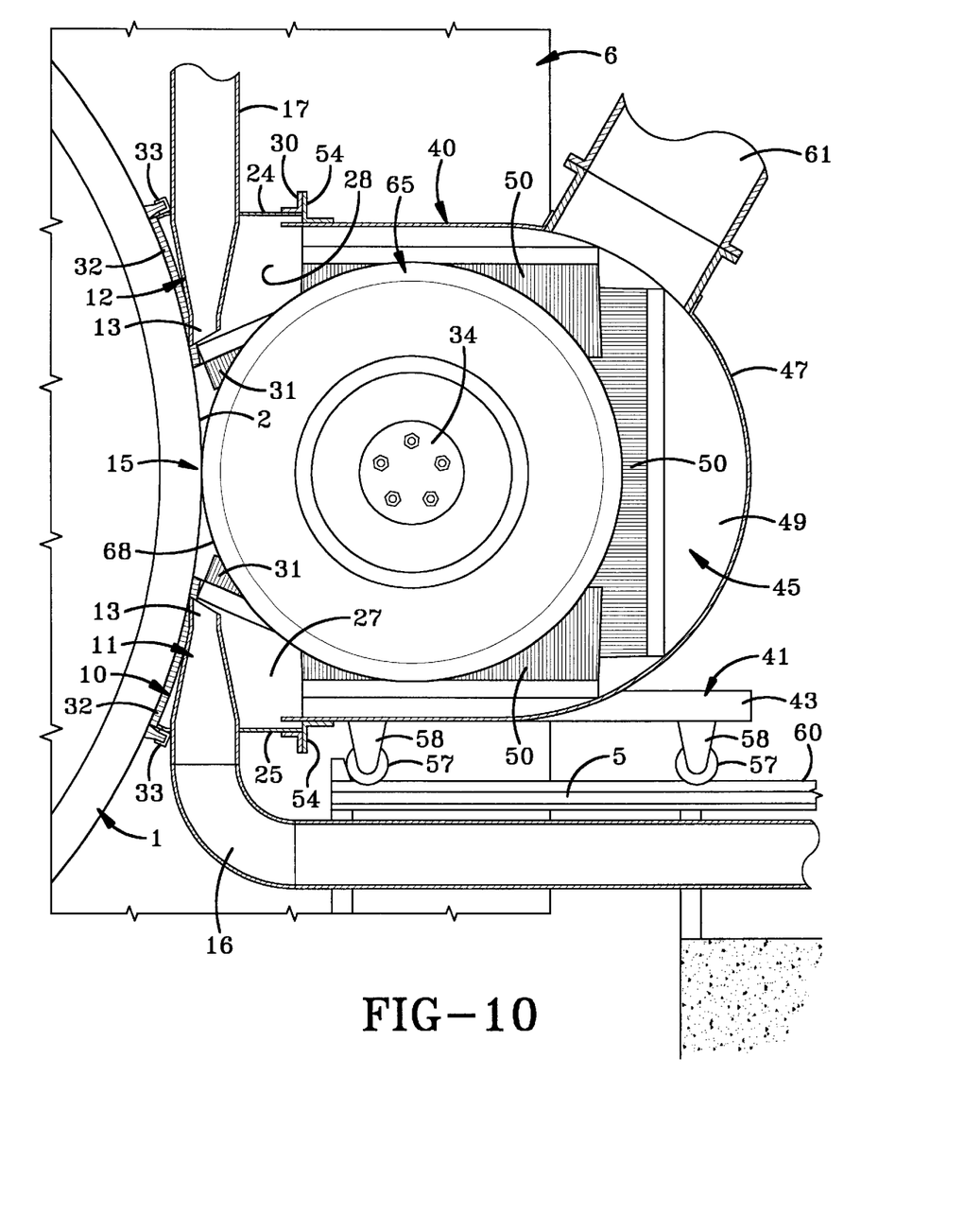
FIG. 10 is a view similar to FIG. 9 with a tire mounted on the tire test apparatus.

FIG. 10 shows tire 65 in its operating position wherein the tread 68 thereof is in contact with abrasive surface 2. FIG.

Figure 11:
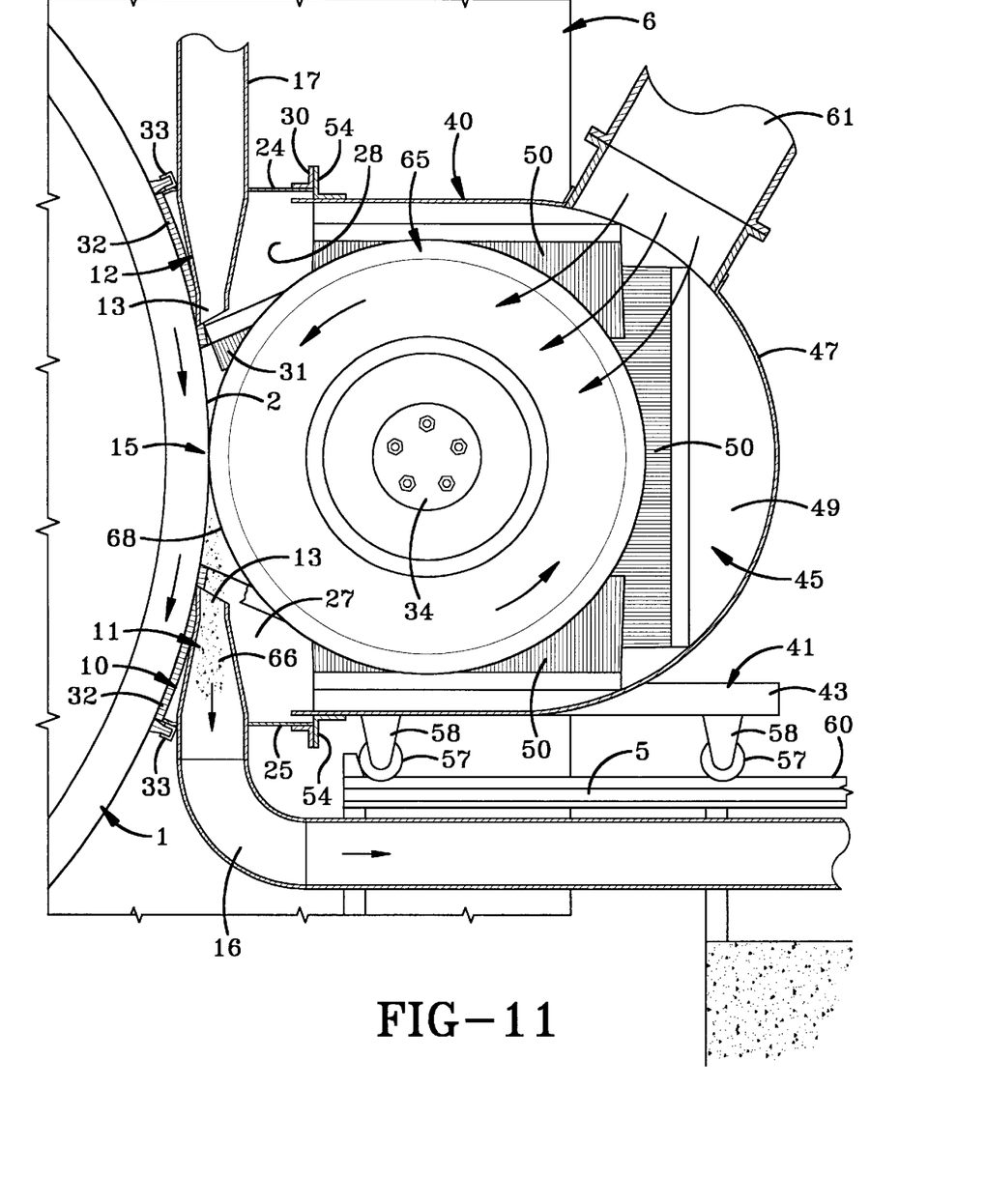
FIG. 11 is a view similar to FIG. 10 showing the testing of the tire with the road wheel moving in a clockwise direction.
Figure 12:
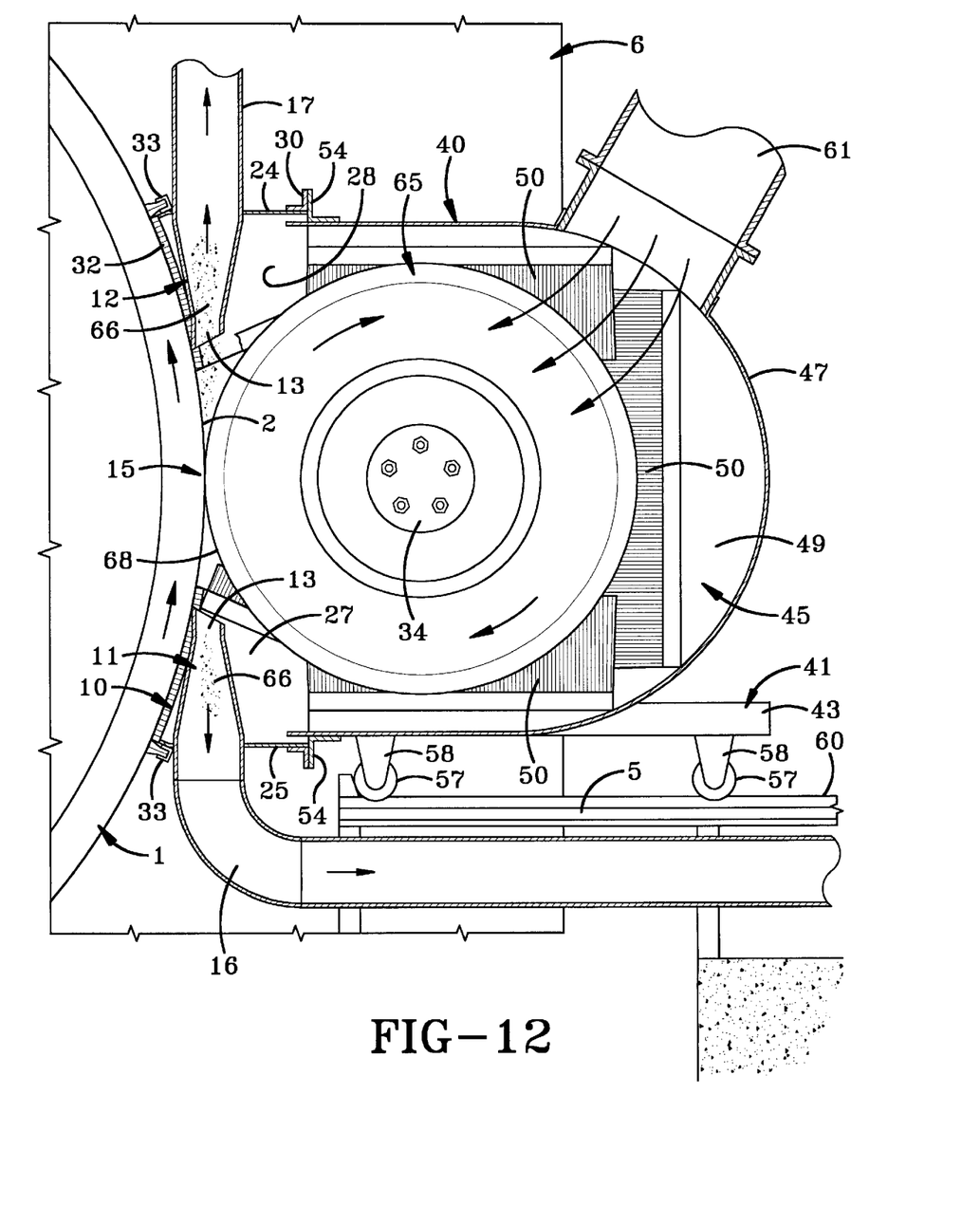
FIG. 12 is a view similar to FIG. 11 showing the testing of the tire with the road wheel moving in the counterclockwise direction.

11 shows tire 65 being rotated in a counterclockwise direction when the road wheel is rotated in the clockwise position. In this test procedure, lower vacuum unit 11 will remove the majority of the particles 66 and when the tire is rotated in a clockwise direction by the counterclockwise motion of the road wheel as shown in FIG. 12, upper vacuum unit 12 will remove most of the powder and particles, although lower unit 11 will still remove some particles and powder due to gravity acting thereon.

It is readily seen that shroud 40 is easily moved along rails 60 to facilitate the placement and removal of a tire onto and from spindle 34 and that shroud chamber 45 is of a sufficient size to permit a range of tire sizes to be tested. Likewise, as discussed above, spindle 34 can be moved very close to road wheel 1 due to sidewall cutout 29 in vacuum chamber 10. Brushes 31, 32 and 50 are formed of a very flexible synthetic fiber or horse hair and assist in maintaining the powder and particles within the vacuum chamber and shroud interior and preventing their dispersion into the surrounding atmosphere. Likewise, duct 61 enables the desired amount of heat or cooling and moisture content to be easily controlled within the relatively small space of vacuum chamber 10 and shroud chamber 45 to provide the desired temperature and moisture at the area of contact 15.

While the embodiments of the invention have been described, the invention is not limited thereto. The claims of the invention follows.

What is claimed is:

1. A tire testing apparatus including a rotatable road wheel with an abrasive surface;

a tire support mechanism for rotatably supporting a tire and moving a tread of the tire into contact with the abrasive surface of the road wheel;

a powder dispenser for dispensing powder onto the abrasive surface of the road wheel;

a first vacuum unit positioned adjacent an area of contact between the tire tread and the abrasive surface of the road wheel for conveying the powder and released tire particles away from said contact area to a remote location;

a shroud having a plurality of walls forming a partially enclosed chamber for receiving the tire and first vacuum unit therein;

means for moving the shroud toward the road wheel to receive the tire and first vacuum unit within the chamber to capture any of the powder and tire tread particles within the chamber and prevent their dispersion into the surrounding atmosphere prior to removal of the powder and particles by the first vacuum unit; and means communicating with the shroud for regulating the temperature within the chamber to control the temperature at the area of contact between the abrasive surface and the tire when the shroud is adjacent the road wheel.

2. The tire testing apparatus defined in claim 1 including a second vacuum unit located adjacent the first vacuum unit, with said first and second vacuum units being located at generally opposite locations of the area of contact.

3. The tire testing apparatus defined in claim 2 in which the first and second vacuum units include a common housing forming a vacuum chamber located adjacent the area of contact; and in which each of the vacuum units is connected to a vacuum source and includes a pair of ducts communicating with the vacuum chamber at opposite locations of the area of contact.

4. The tire testing apparatus defined in claim 3 including flexible seals extending between the vacuum chamber housing and road wheel to assist in retaining the powder and particles in the vacuum chamber.

5. The tire testing apparatus defined in claim 4 in which the flexible seals are curved brushes.

6. The tire testing apparatus defined in claim 3 in which the vacuum unit housing and shroud have open front ends; in which said ends are defined by a plurality of flanges; in which said open front ends are in alignment with each other when the shroud is moved adjacent the vacuum unit; and in which the vacuum housing flanges are in abutting engagement with the shroud flanges.

7. The tire testing apparatus defined in claim 1 in which the shroud includes a housing having a side opening adapted to receive a tire mounting spindle therethrough; and in which a plurality of flexible brushes are mounted on the housing and extend into said side opening.

8. The tire testing apparatus defined in claim 2 in which a duct extends from each of the vacuum units to a source of vacuum.

9. The tire testing apparatus defined in claim 1 in which one of the shroud walls is formed with an opening; and in which a plurality of brushes are mounted on the housing and at least partially cover said opening.

10. The tire testing apparatus defined in claim 1 in which the means for moving the shroud includes a plurality of wheels and spaced rails on which the wheels are movably mounted.

11. The tire testing apparatus defined in claim 1 in which the means for regulating the temperature within the shroud chamber includes a duct extending from the shroud to a temperature source.

12. A method of removing debris from adjacent a tire/road wheel contact area of an indoor tire test machine including the steps of:

providing a vacuum chamber adjacent the contact area;

placing a tire to be tested on a spindle wherein a portion of said tire extends into the vacuum chamber;

moving a shroud into proximity with the vacuum chamber to form a debris collection chamber;

controlling the temperature within the debris collection chamber;

bringing the tire into rotational contact with the road wheel producing tread particles; and creating at least a partial vacuum within the vacuum chamber to remove the particles from within the debris collection chamber.

13. The method defined in claim 12 including the step of providing a partial vacuum on opposite sides of the tire/road wheel contact area.

14. The method defined in claim 12 including the step of applying a powder on the road wheel upstream of the tire/road wheel contact area.

15. The method defined in claim 12 including the step of providing a vacuum chamber and a shroud at diametrically opposite sides of the road wheel.

* * * * *